O. BONNEY, Jr.
Horse Hay-Rake.
No. 111,308.
Patented Jan. 31, 1871.
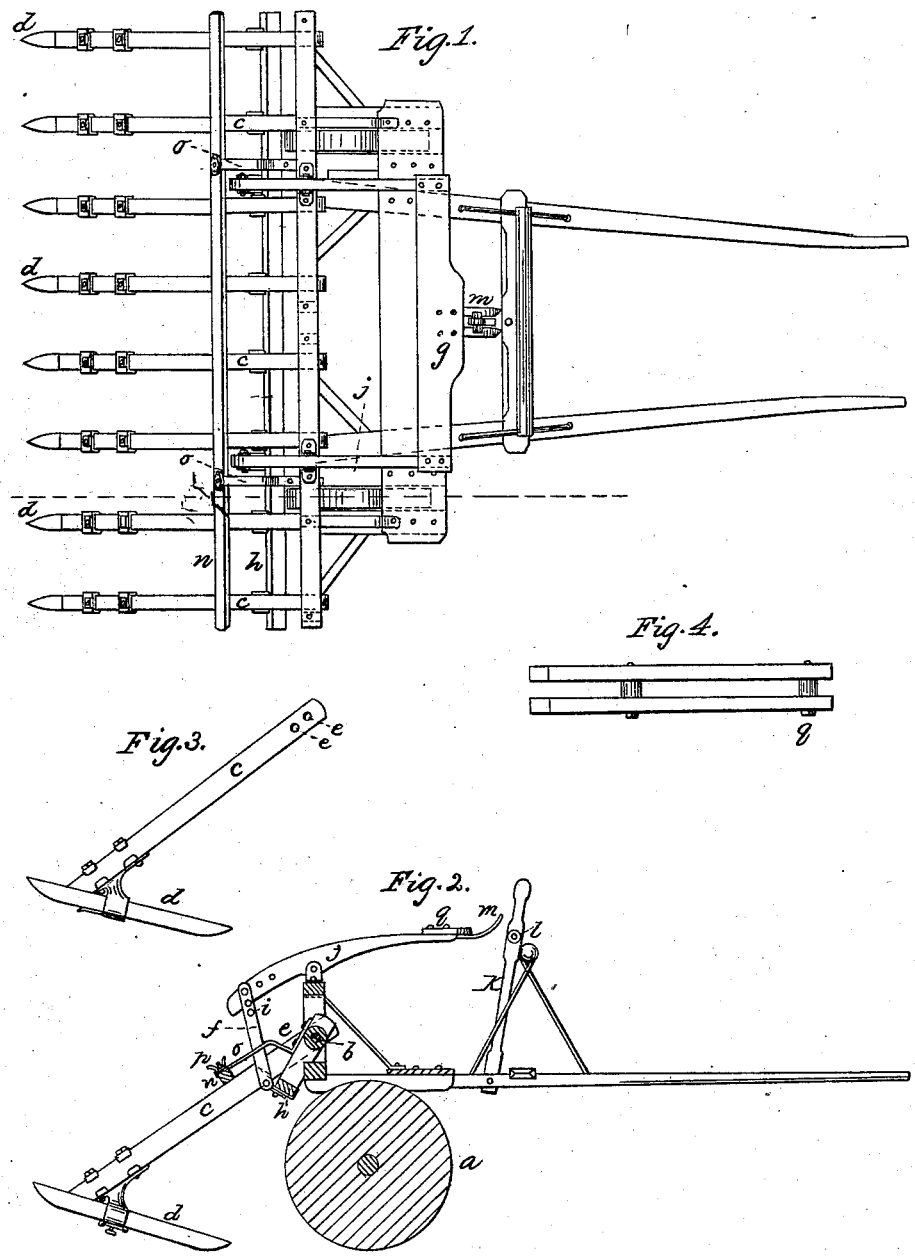
Witnesses:
Inventor:

United States Patent Office.

OLPHA BONNEY, JR., OF SAN FRANCISCO, CALIFORNIA.

Letters Patent No. 111,308, dated January 31, 1871.

IMPROVEMENT IN HORSE HAY-RAKES.

The Schedule referred to in these Letters Patent and making part of the same.

I, OLPHA BONNEY, Jr., of the city of San Francisco, in the State of California, have invented certain Improvements on Horse-Rakes, of which the following is a specification.

The present improvements have reference to a rake on which Letters Patent were granted to me 23d November, 1869, and are of the character of an "additional improvement" to the invention covered by that patent.

The drawing forming part of this specification shows a horse-rake with my improvement forming a part thereof—

Figure 1 being a top view;

Figure 2, a view by vertical section on the line dotted in fig. 1;

Figure 3, a view of a tooth and bar detached from the rake; and

Figure 4, a view of a bar made of two pieces instead of one piece, as shown by the other figures.

The position of the wheels $a$, as will be noticed, are placed quite forward of the rods or frame holding the tooth-bars.

This position of the wheels increases the space for the hay between the wheels and the teeth of the rake, and thus gives greater capacity to the rake than can exist when the wheels are placed further back or nearer to the teeth of the rake.

The rods $b$, on which the bars $c$ holding the teeth $d$ hinge, are only one-half the width of the rake, and have on their inner ends nuts, by which they may tighten the pieces filling in between the bars $c$, and thus not allow too much play of the rake-bars.

In the upper ends of the bars $c$ are two or more holes, $e$, for adjusting the bar and teeth.

In the straps $f$, connecting the seat $g$ to the lifting beam $h$, are several holes $i$, and also in the end of the arms or levers $j$ of the seat, which are to regulate the elevation which it is desired to dump or to raise the teeth from the ground, the outer holes rising higher than is necessary for ordinary raking, but to be used in cocking or bunching hay after being windrowed.

The position of the seat $g$ on the forward end of the levers $j$ allows the weight of the driver to act in raising the rake, which works the rake with great ease, the weight of the driver more than balancing the rake, and when filled with hay a slight pull down on the hand-lever $k$ in front of the seat easily dumps the rake, (the hand-lever being thrown forward,) and a gentle push up drops the teeth to the ground, bringing the rollers $l$ in the hand-lever under the points of the irons $m$ connected to the seat, and the hand-lever being drawn back to the seat raises the seat and forces down the lifting beam $h$ under the bars, allowing the latter to drop down on uneven ground and preventing the man's weight from raising the rake until filled, the hand-lever being changeable up and down.

The driver's seat $g$ may be narrowed toward the center to an ordinary-sized seat, if desirable.

The spring-bar $n$, running across on top of the rake-bars, held by springs $o$ and thumb-nut $p$, is designed more especially for cocking or bunching hay after being windrowed, holding the bars down and forcing the hay in front; but may be used in raking any ordinary ground and do excellent word, the springs allowing the bars $c$ and teeth to throw up the spring-bar from six inches to one foot.

On very rough ground the bar $n$ is to be removed by turning up the thumb-nuts and raising the springs.

A bar for holding the tooth, made up of two pieces, is shown in fig. 4 of the drawing, the bars being connected by bolts.

The rod $q$, through the top, represents the rod of one-half of the rake on which the tooth-bars hinge.

This manner of making the bars will allow the use of very light timber for the bars, and yet make them sufficiently strong and very cheap.

By fig. 3 is shown a bar, tooth, and shank connected, but the tooth held in place by a spring, $r$, instead of a set-nut, which would do very well, holding the tooth firmly up against the beveled or extreme end of the bar, and preventing the tooth from moving when at work.

What I claim as my invention is—

1. The driver's seat $g$, provided with irons $m$, in combination with the hand-lever $k$, arranged to operate in connection with the bars and teeth of the rake, as described.

2. The combination of the spring $r$, tooth $d$, with bar $c$ and connecting-shank, as set forth.

This specification signed this 5th day of September, 1870.

OLPHA BONNEY, JR.

Witnesses:
WILLIAM MOODY,
GEO. C. WALLER.